Patented July 28, 1925.

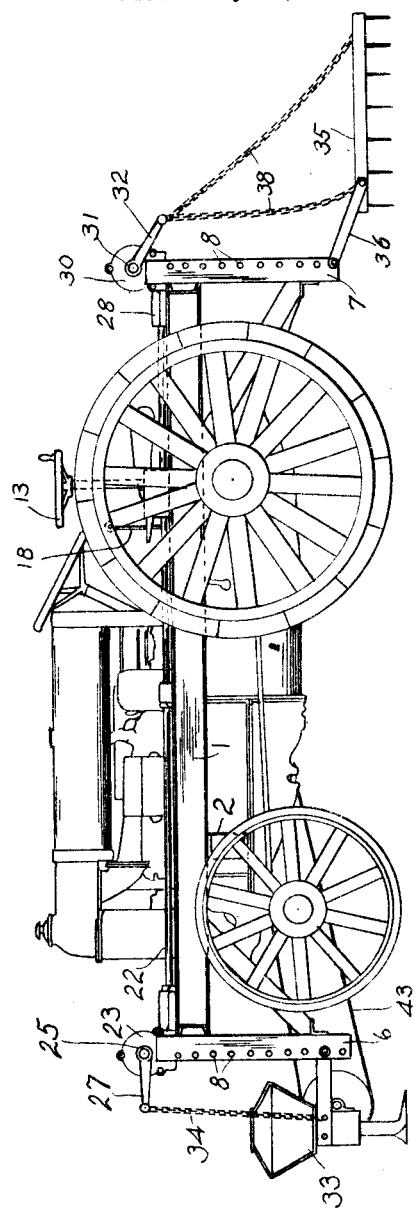

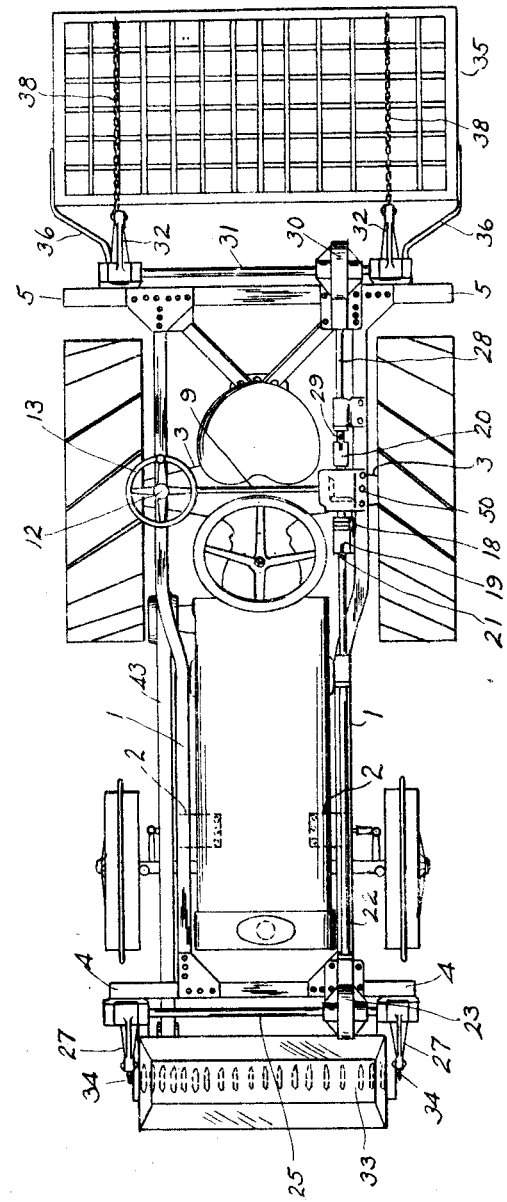

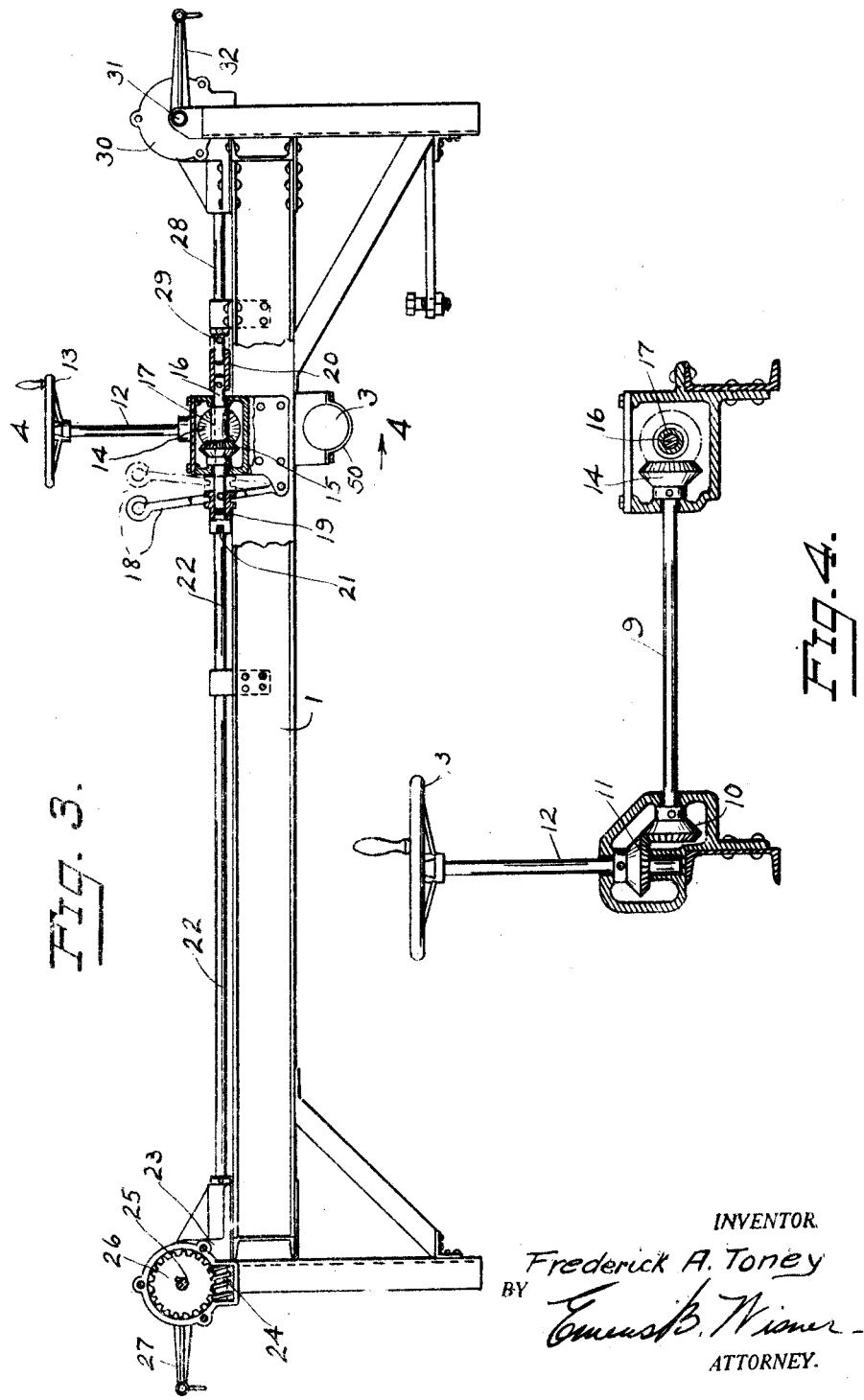

1,547,271

UNITED STATES PATENT OFFICE.

FREDERICK A. TONEY, OF DETROIT, MICHIGAN.

ATTACHMENT FOR TRACTORS.

Application filed July 30, 1923. Serial No. 654,549.

*To all whom it may concern:*

Be it known that I, FREDERICK A. TONEY, a citizen of the United States, residing at Detroit, county of Wayne, State of Michigan, have invented a certain new and useful Improvement in Attachments for Tractors, and declare the following to be a full, clear, and exact description of the same, such as will enable others skilled in the art to which it pertains to make and use the same, reference being had to the accompanying drawings, which form a part of this specification.

This invention relates to attachments for tractors and the object of the invention is to provide an attachment by which farm implements may be secured to a tractor in a manner to be supported and carried thereby thus obviating the necessity for ground wheels on the farm implements. Another object of the invention is to provide an attachment for the tractor having adjusting means at each end of the tractor whereby the farm implements carried by the tractor may be adjusted in relation thereto. A further object of the invention is to provide an attachment for tractors to which farm implements may be attached, mechanism being provided for raising or lowering the farm implement at either end of the tractor from the driver's seat. A further object of the invention is to provide an attachment for tractors for supporting different farm implements whereby the farm implement at either end may be raised or lowered or adjusted independently from the farm implement at the opposite end and when so adjusted is locked in position. These objects and the several novel features of the invention are hereinafter more fully described and claimed and the preferred form of construction by which these objects are attained is shown in the accompanying drawings in which—

Fig. 1 is a side elevation of the tractor with my attachment secured thereto.

Fig. 2 is a plan view thereof.

Fig. 3 is a side elevation of the attachment separate from the tractor.

Fig. 4 is a section taken on line 4—4 of Fig. 3.

Figure 5:
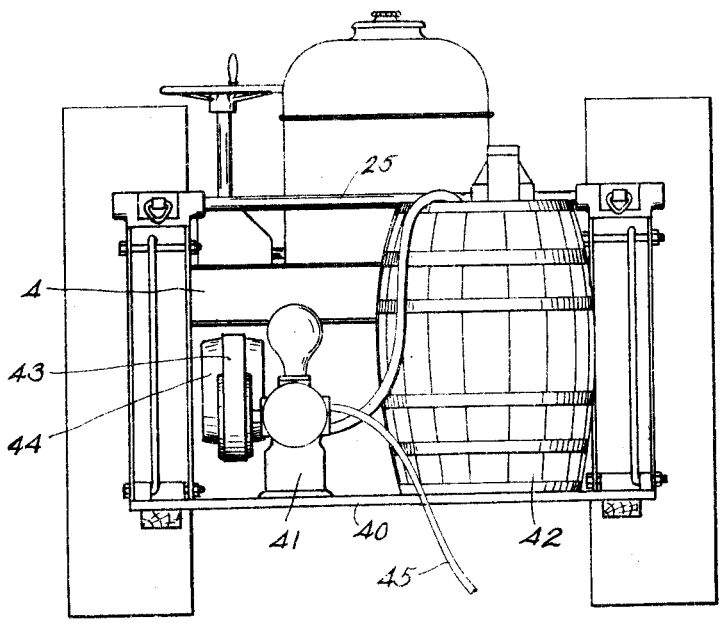
Fig. 5 is a view showing a spraying apparatus mounted on the tractor.

As shown in Figs. 1, 2 and 3 the attachment comprises a pair of side frame members 1 which are secured to the tractor near the forward end by the brackets 2. These frame members 1 are also attached to the rear axle 3 of the tractor by the brackets 50 shown in Fig. 3. The cross member 4 is provided with a depending frame member 6 secured to each end thereof and the cross member 5 is provided with a depending frame member 7 secured to each end thereof and the depending frame members 6 and 7 are provided with a series of spaced apertures 8 to which farm implements may be attached. A shaft 9 shown more particularly in Figs. 2 and 4 extends across between the frame member 1 and is rotatably mounted thereon. This shaft 9 is provided with a bevel gear 10 which meshes with a bevel gear 11 on a shaft 12 provided with a hand wheel 13 so that rotation of the hand wheel and shaft 12 rotates the shaft 9. The shaft 9 at the opposite end is provided with a bevel gear 14 meshing with the bevel gear 15 on a short shaft 16 shown in Fig. 3. This shaft 16 is keyed to the gear 15 and to a sleeve 17 and is slidable longitudinally through the gear and sleeve. A lever 18 is provided which is movable as shown in dotted lines in Fig. 3 to move the shaft 16 longitudinally. The shaft 16 is provided with a clutch member 19 at one end and a clutch member 20 at the opposite end and the clutch member 19 in the position shown in full lines in Fig. 3 is adapted to engage over a pin 21 on the shaft 22 the shaft 22 being rotatably mounted on the frame member 1. By turning the hand wheel 13 it can thus be seen that the shaft 22 may be rotated. This shaft 22 extends into a housing 23 mounted on the frame member 1 and cross member 4 and is provided with a worm 24 secured to the end thereof within the housing 23. A shaft 25 is rotatably mounted in the housing 23 and on the opposite end of the frame member 4 and a worm gear 26 is secured thereto meshing with the worm 24. As shown in Figs. 1, 2 and 3 an arm 27 is secured to each end of the shaft 25 and by turning the shaft 25 the arms 27 are turned. A shaft 28 is rotatably mounted on the frame 1 in longitudinal alignment with the shafts 16 and 22. This shaft 28 is provided with a pin 29 which is adapted to be engaged by the clutch member 20 when the lever 18 is moved to the dotted position shown in Fig. 3 to rotate the shaft 28. One end of the shaft 28 is rotatably mounted in the housing 30 and is provided with a worm which is the reverse of the worm 24. This worm meshes with a worm gear in the housing 30 which is similar to the gear 26 and is secured to the shaft 31 and a pair of arms 32 similar to the arms 27 are secured to the shaft 31.

In operation a farm implement such as a seeder 33 may be pivotally attached to the members 6 in the apertures 8 as shown in Fig. 1 and chains 34 connect the arms 27 with the seeder. Another farm implement such as a drag 35 may be pivotally attached to the members 7 by the links 36 and the arms 32 may be each connected to the drag by one or more chains 38 as shown in Figs. 1 and 2. At this time the lever 18 may be moved to the position shown in full lines in Fig. 3 at which time the hand wheel 13 may be turned to rotate the shaft 22 and the shaft 25 thus regulating the position of the arms 27 to position the seeder in correct relation with the ground surface. By moving the lever 18 to the position shown in dotted lines in Fig. 3, the hand wheel 13 may be turned to rotate the shaft 28 and the shaft 31 thus turning the arms 32 and regulating the position of the drag 35 in relation to the surface of the ground as will be readily understood. By this arrangement the farm implement at either end of the tractor may be raised or lowered to the desired position in relation to the ground surface and by means of the worm and worm gear arrangement the arms 32 and 27 are locked at any position. The worm and gear construction also allows accurate regulation of the arms which is of particular advantage with the seeder shown in Fig. 1 which may be regulated to plant seeds at an exact depth below the ground surface. At the end of the row by rotation of the hand wheel 13 and movement of the lever 18 the farm implements at each end of the tractor may be raised while the tractor is turned and the farm implements may be held in the raised position while travelling from one field to another or while travelling on the road. While I have shown in Fig. 1 a seeder and drag as used with the tractor it will be readily understood that most of the various farm implements may be thus attached to the tractor and by the method of support the farm implements need not be provided with wheels.

Figure 6:
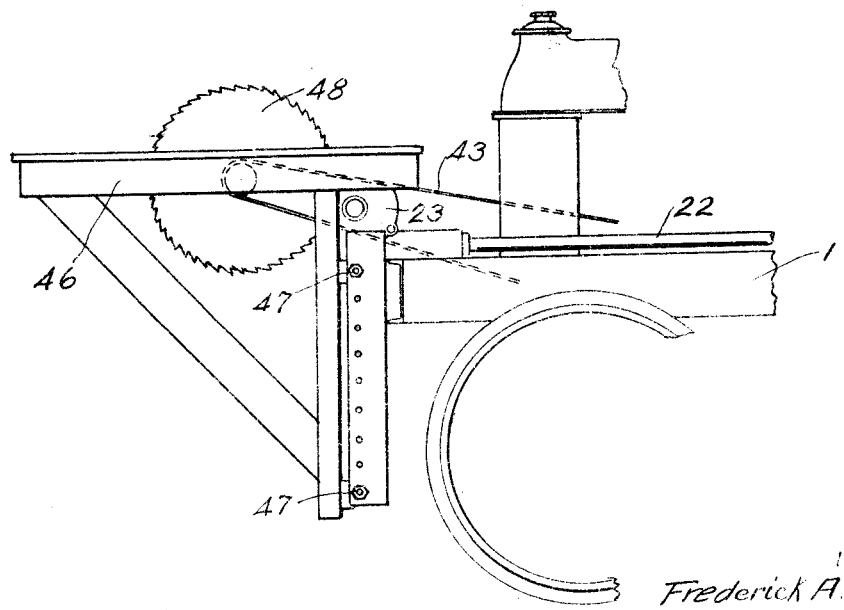
Fig. 6 is a view showing a circular saw and table mounted thereon.

In Fig. 5 I have shown a platform 40 attached to the frame on which a pump 41 and a barrel 42 are mounted. The barrel 42 is filled with a spray mixture and the pump is driven by a belt 43 passing over the pulley 44 which is driven by the tractor. By this arrangement the tractor may be driven through an orchard and the orchard may be sprayed by a person standing on the platform 40 by means of the spray hose 45 as will be readily understood. As shown in Fig. 6 a table 46 may be secured to the frame by the bolts 47 and the belt 43 may be arranged to drive a saw 48. This arrangement provides a portable power saw so that wood may be sawed up at the place where the trees are cut thus reducing labor and hauling costs. Various other combinations of this type may be made, Figs. 5 and 6 being utilized to illustrate two different combinations which result in great labor saving.

From the foregoing description it becomes evident that the device is very simple and efficient in operation, will not easily get out of order, is of low manufacturing cost in comparison with the results attained and provides a device which accomplishes the objects described.

Having thus fully described my invention, its utility and mode of operation, what I claim and desire to secure by Letters Patent of the United States is—

1. An attachment for tractors comprising a substantially rectangular frame secured to the tractor in horizontal position, a pair of depending frame members secured to each end of the rectangular frame and adapted for the pivotal attachment of implements thereto, a shaft rotatably mounted on each end of the frame, a pair of arms secured to each shaft and extending over the implements in parallel relation therewith, means connecting the arms with the implements, and manually operable means for rotating each shaft independently.

2. An attachment for tractors comprising a substantially rectangular frame of greater length than the over-all length of the tractor, each end of the frame being provided with downwardly extending frame portions adapted for the pivotal attachment of implements thereto, a shaft rotatably mounted on each end of the frame, arms secured to each shaft and extending in parallel relation with the respective implements, means connecting the ends of the arms with the ends of the implements opposite the pivot points thereof, and manually operable means for rotating the shafts.

3. An attachment for tractors including an open frame, means for attaching said frame to a tractor with portions of the tractor projecting upwardly through the said frame and with the ends of the frame projecting beyond the ends of the tractor, the said frame having depending portions at their extended ends thereof extending toward the ground beyond the ends of the tractor to form a place for pivotal attachment of implements thereto, a shaft rotatably mounted on each end of the frame, a pair of arms secured to each shaft and connected with the implements and manually operable means for rotating the shafts.

In testimony whereof, I sign this specification.

FREDERICK A. TONEY.